US012587861B2

(12) United States Patent
Vaughn et al.

(10) Patent No.: US 12,587,861 B2
(45) Date of Patent: Mar. 24, 2026

(54) PRIVACY CONTROL GEOFENCING

(71) Applicant: Intel Corporation, Santa Clara, CA (US)

(72) Inventors: Robert Lawson Vaughn, Portland, OR (US); Cagri Cagatay Tanriover, Bethany, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 18/618,479

(22) Filed: Mar. 27, 2024

(65) Prior Publication Data

US 2025/0310774 A1 Oct. 2, 2025

(51) Int. Cl.
*H04W 12/64* (2021.01)
*G06F 21/62* (2013.01)
*H04W 12/02* (2009.01)

(52) U.S. Cl.
CPC ........ *H04W 12/64* (2021.01); *G06F 21/6245* (2013.01); *H04W 12/02* (2013.01)

(58) Field of Classification Search
CPC .... H04W 12/64; H04W 12/02; G06F 21/6245
See application file for complete search history.

(56) References Cited

U.S. PATENT DOCUMENTS

| | | | | |
|---|---|---|---|---|
| 9,262,596 B1 * | 2/2016 | Steiner | ..................... | G06F 21/10 |
| 9,396,354 B1 * | 7/2016 | Murphy | .................. | H04L 51/18 |

| | | | | |
|---|---|---|---|---|
| 10,284,558 B2 * | 5/2019 | Owen | ................. | H04L 63/0428 |
| 11,564,055 B2 * | 1/2023 | Jones | ............... | G08B 13/19621 |
| 11,902,855 B2 * | 2/2024 | Borras | .................. | H04W 12/06 |
| 11,910,185 B1 * | 2/2024 | Branscomb | ......... | G06F 21/6245 |
| 12,127,070 B2 * | 10/2024 | Ulewicz | ................ | H04W 12/64 |
| 12,439,245 B1 * | 10/2025 | Branscomb | ........... | H04W 12/02 |
| 2013/0002891 A1 * | 1/2013 | Singh | ..................... | G06Q 40/00 |
| | | | | 348/E5.042 |

(Continued)

FOREIGN PATENT DOCUMENTS

| | | | | |
|---|---|---|---|---|
| CA | 3016762 A1 * | 9/2017 | ............... | G07C 9/28 |
| CN | 118043811 A * | 5/2024 | ......... | G06F 21/6245 |

(Continued)

OTHER PUBLICATIONS

"European Application Serial No. 25164840.8, Extended European Search Report mailed Aug. 26, 2025", 8 pgs.

*Primary Examiner* — John B King

(74) *Attorney, Agent, or Firm* — Banner & Witcoff, Ltd.

(57) ABSTRACT

Systems and techniques may be used for enhancing privacy and security within a geofencing system. An example technique may include monitoring for at least one media capture violating a personal geofence associated with a first user device, and detecting that the at least one media capture violates the personal geofence associated with the first user device, the at least one media capture including at least one of a photo, video, or audio captured by a second user device. The example technique may include, in response to detecting that the at least one media capture violates the personal geofence associated with the first user device, notify the first user device, by the server, of the at least one media capture occurring within the personal geofence associated with the first user device.

20 Claims, 9 Drawing Sheets

(56)                    References Cited

U.S. PATENT DOCUMENTS

| | | | | |
|---|---|---|---|---|
| 2013/0217332 | A1* | 8/2013 | Altman | G06Q 20/3224 |
| | | | | 455/3.01 |
| 2015/0113661 | A1* | 4/2015 | Mishra | H04N 21/4223 |
| | | | | 726/26 |
| 2015/0237470 | A1* | 8/2015 | Mayor | G01C 21/3484 |
| | | | | 455/456.2 |
| 2015/0242638 | A1* | 8/2015 | Bitran | G06F 21/6245 |
| | | | | 726/26 |
| 2016/0034712 | A1* | 2/2016 | Patton | G06Q 50/01 |
| | | | | 726/28 |
| 2016/0088546 | A1* | 3/2016 | Birch | G06Q 30/0261 |
| | | | | 455/456.3 |
| 2016/0286345 | A1* | 9/2016 | Macdonald | H04W 52/0229 |
| 2016/0321697 | A1* | 11/2016 | Chaney | G06Q 50/01 |
| 2017/0126630 | A1* | 5/2017 | Ekambaram | H04L 63/102 |
| 2018/0060954 | A1* | 3/2018 | Yin | H04L 63/08 |
| 2018/0061010 | A1 | 3/2018 | Akselrod et al. | |
| 2018/0234431 | A1* | 8/2018 | Meredith | H04L 41/28 |
| 2018/0324546 | A1* | 11/2018 | Jones | H04W 4/021 |
| 2018/0343538 | A1* | 11/2018 | Bastide | H04L 67/52 |
| 2019/0228435 | A1* | 7/2019 | Deluca | G06Q 30/0261 |
| 2019/0385328 | A1* | 12/2019 | Grosse-Kunstleve | |
| | | | | H04N 23/57 |
| 2020/0279461 | A1* | 9/2020 | Koskan | H04W 4/022 |
| 2021/0056231 | A1* | 2/2021 | Kwatra | H04W 12/63 |
| 2021/0084451 | A1* | 3/2021 | Williams | A61B 5/165 |
| 2022/0245560 | A1* | 8/2022 | Dhaliwal | H04W 4/021 |
| 2025/0124168 | A1* | 4/2025 | Paspuel | G06F 21/6245 |

FOREIGN PATENT DOCUMENTS

| | | | | |
|---|---|---|---|---|
| DE | 112016005854 T5 * | 10/2018 | | H04W 4/025 |
| WO | WO-2015126422 A1 | 8/2015 | | |
| WO | WO-2016112052 A1 * | 7/2016 | | H04W 4/021 |

* cited by examiner

100

102

FIRST USER DEVICE

104

MEMORY

106

PROCESSOR

108

DISPLAY

USER INTERFACE

110

SERVER

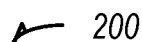
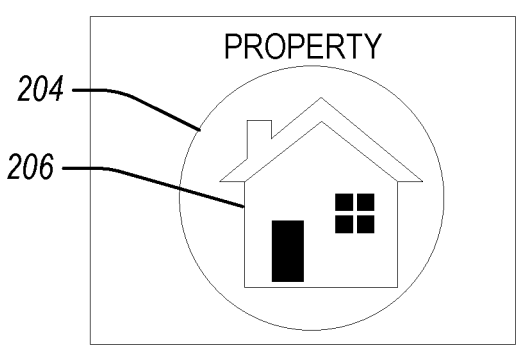
FIG. 2A
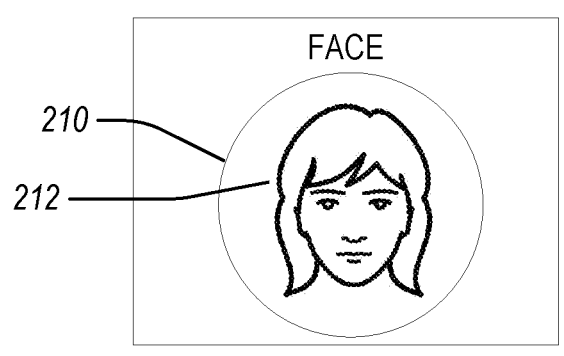
FIG. 2B
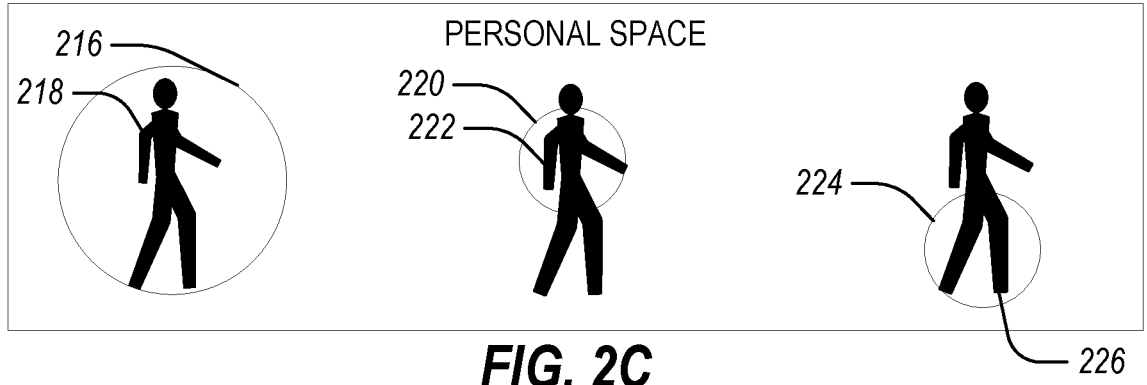
FIG. 2C
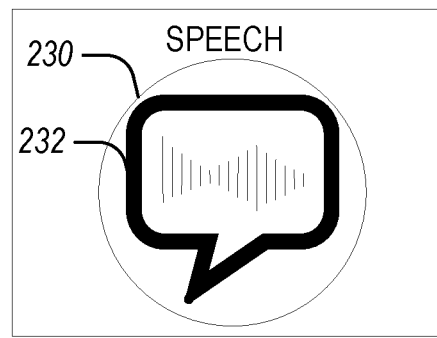
FIG. 2D

600

ESTABLISH A DATA SET

QUERY A DATA SET

EVALUATE A QUERY AGAINST A DATA SET

OUTPUT A RESPONSE TO THE QUERY

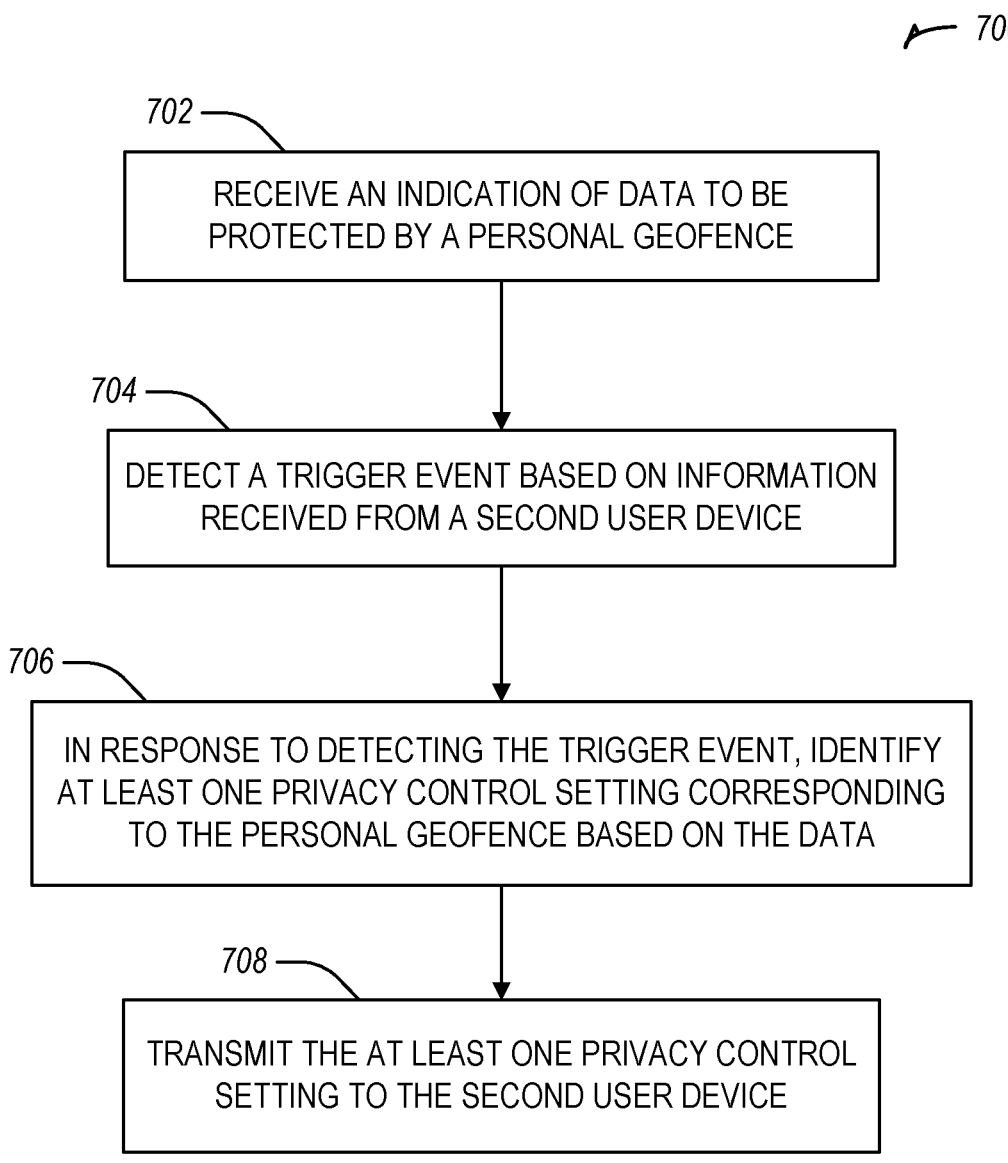

700

702 —

RECEIVE AN INDICATION OF DATA TO BE
PROTECTED BY A PERSONAL GEOFENCE

704 —

DETECT A TRIGGER EVENT BASED ON INFORMATION
RECEIVED FROM A SECOND USER DEVICE

706 —

IN RESPONSE TO DETECTING THE TRIGGER EVENT, IDENTIFY
AT LEAST ONE PRIVACY CONTROL SETTING CORRESPONDING
TO THE PERSONAL GEOFENCE BASED ON THE DATA

708 —

TRANSMIT THE AT LEAST ONE PRIVACY CONTROL
SETTING TO THE SECOND USER DEVICE

*FIG. 7*

PRIVACY CONTROL GEOFENCING

BACKGROUND

The domain of geofencing, especially in the context of digital and interconnected systems, has experienced significant advancement with the adoption of technologies aimed at broadening the application and utility of geofences. Geofences are used to limit aspects of data transfer, data capture, or data use within a defined geographic boundary. Some geofences may limit use, transfer, or capture to within the geofence, while others may limit use, transfer, or capture to outside the geofence. Geofences typically have uses in enforcing privacy, ensuring confidentiality, or preventing copying.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 2A-2D illustrate applications of personal geofences according to various examples.

FIG. 7 illustrates a flowchart showing a technique for transmitting a privacy control setting to a second user device in response to a trigger event.

DETAILED DESCRIPTION

Systems and techniques described herein may be used to generate, communicate about, and use a geofence. The geofence may be a personal geofence (e.g., specific to a person or object). The geofence may be dynamic (e.g., changing in location, changing in size, changing over time, etc.). The geofence may be for a facial feature, voice, land, etc. The geofence may be used to permit or restrict access or use of data. As used herein, a "geofence" includes aspects beyond traditionally defined geographic boundaries and may include any spatial area capable of being sensed, tracked, or defined (e.g., a face, an object such as a vehicle, a shoreline, etc.). Such a "geofence" may dynamically adapt to changes, not only in physical location, but also in size or configuration, such as according to various privacy needs or in various contexts.

In an example, a new Internet framework, called a geofence service (GFS) framework may be used. The GFS framework may be interoperable with hosts of independently operated GFS servers that ingest, process, distribute, or answer queries associated with geofence requests. In some examples, streaming of dynamic geofence coordinates allows for a geofence to be specified for a moving object (e.g., vehicle) in an efficient manner.

Figure 1:
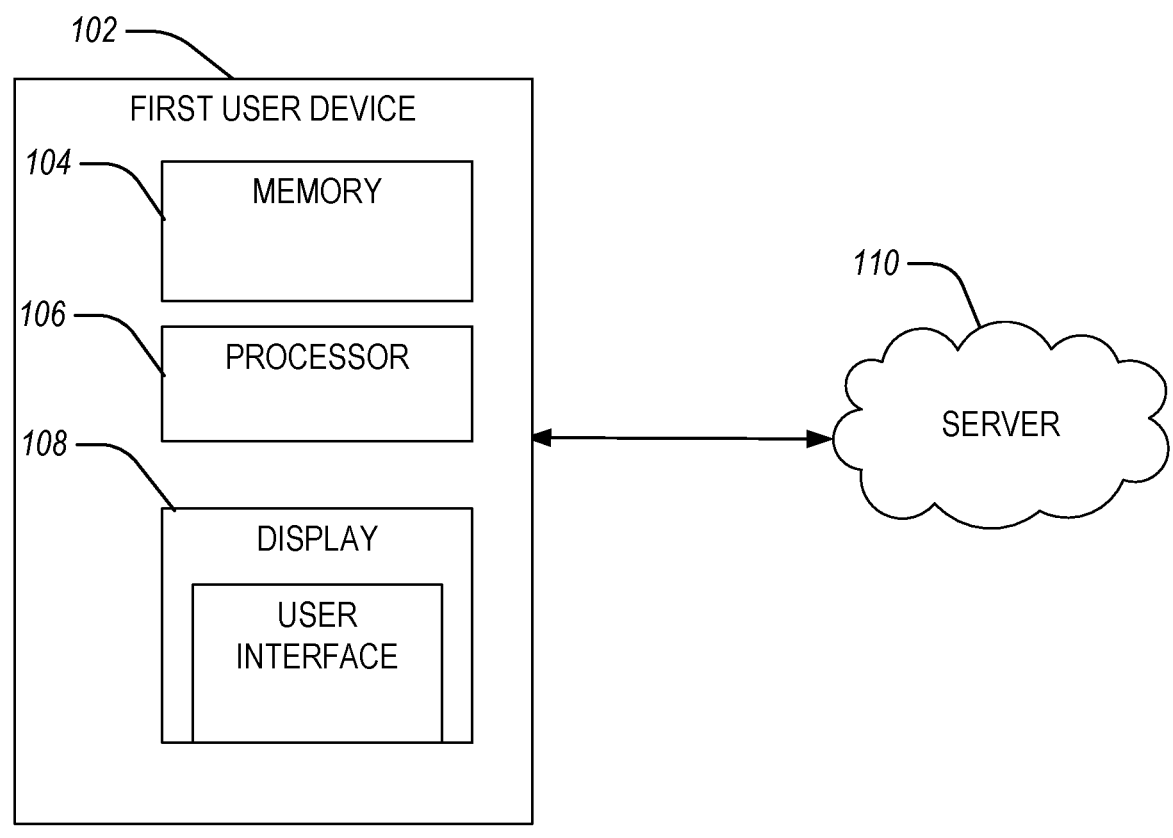
FIG. 1 illustrates an example first user device for establishing a personal geofence, according to various examples.

FIG. 1 illustrates an example first user device 102 for establishing a personal geofence, according to various examples. The first user device 102 includes memory 104 and a processor 106. A user interface may be presented on the user device 102 via a display 108 to allow a user to define or manage a personal geofence. The first user device 102 may communicate with a server 110 to receive or transmit personal geofence data.

In some examples, a user may opt in for protection of data via a toggle or selection of a personal geofence via the user interface presented on the display 108. Upon activation, the server 110 may be used to output information corresponding to the protection. For example, when another device enters or captures the geofenced area, the server 110 may engage a privacy control setting to automatically apply a protection measure. For example, an indication may be sent to the other device to prohibit capture or editing of an image, a video or an audio recording. The first user device 102 may communicate selection of a setting to the server 110, which may process and store the privacy setting.

In another example, a user may specify at least one privacy control setting for a type of data within the geofenced area. For example, the user may designate that a photo capturing a face of a particular person (e.g., a personal geofence) or a face within a geofenced area is to be automatically blurred. The server 110 may analyze content captured within a geofence d area or captured of a personal geofence to identify a face in an image. Once content related to a geofence is identified, a specified privacy control setting (e.g., as selected by a user or automatically by the server 110) may be applied, for example before the data is transmitted or stored, or after storage on already captured data.

FIGS. 2A-2D illustrate applications of personal geofences, such as a property boundary, a specific body region, vocal data, etc. according to various examples. In FIG. 2A, a location-based geofencing is shown as a personal geofence 204 encompassing a property 206. In some examples, the personal geofence 204 is used to automatically activate a home security system, for example when a particular device exits the personal geofenced 204. In another example, an alert may be sent to a particular device when an unrecognized device enters the personal geofence 204. In some examples, the personal geofence 204 is used to disable a recording feature on a device detected within the personal geofence 204, for example to ensure privacy within the property 206.

FIG. 2B depicts a facial geofence 210 around a face 212 of a user. In an example, the user may capture an image or video of their face 212, and select an area around their face 212 (or automatically) to define the facial geofence 210. The facial geofence 210 may be used with a social media platform to allow a user to automatically apply a privacy setting to their face 212, such as before a photo or video is posted to the social media platform. For example, the user may submit the facial geofence 210 to the social media platform, which may check a photo or video after uploading but before making the photo or video publicly accessible. The social media platform may apply the privacy setting based on the facial geofence 210 (e.g., when the face 212 is detected in the image or video). In an example, the facial geofence 210 may be used to control how an avatar or digital representation of the user appears to others.

In FIG. 2C, various personal geofences are shown, such as a personal geofence 216 around an entire body 218 of a user, a personal geofence 220 around a torso 222 of a user, and a personal geofence 224 around legs 226 of a user. Gait may be used to recognize a user, but in some examples, body attributes of a person are not unique enough to identify the person. In these examples, the person may be recognized in another way before applying the personal geofence, such as by a device identifier, facial identification, or the like.

In an example, a user participating in a sporting event may use the geofence 220 around their upper body 222 to specifically protect sponsorship logos or team insignia on their apparel from unauthorized commercial use or replication in photos and videos. In another example, the geofence 224 around the lower body 226 may be used by an individual to obscure identifying features or equipment in publicly shared media.

FIG. 2D illustrates a personal geofence 230 protecting against information sharing related to the user's voice 232. In FIG. 2D, the personal geofence 230 is a vocal geofence that may be used to protect the user's voice 232 from unauthorized use or capture. The user may provide a short recording of their voice 232, which may be used to extract unique voice features of that individual, such as acoustic or prosodic characteristics. The recording may be used to create a distinct vocal "fingerprint" for that person. The fingerprint may be used to activate the vocal geofence 230, such as when the voice 232 is detected in media. In an example, the personal geofence 230 is used to automatically mute or alter the user's voice 232 in videos or audio recordings, for example shared on a social media platform.

Figure 3:
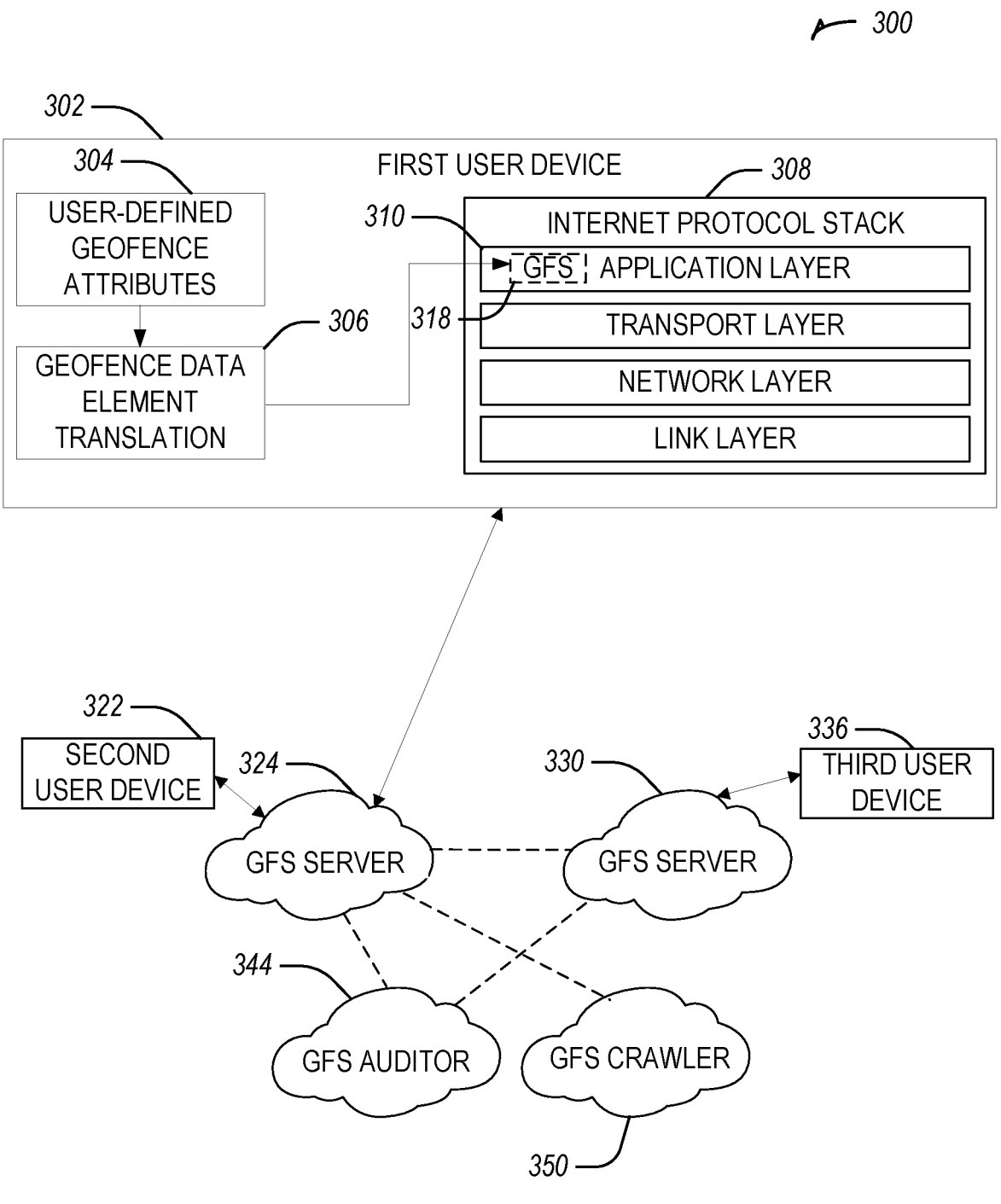
FIG. 3 illustrates a system diagram for personal geofence communication, according to various examples.

FIG. 3 illustrates a system diagram 300 for personal geofence communication, according to various examples. The system diagram 300 includes an illustration of a first user device 302. The first user device 302 is shown with an example data flow for communicating with a GFS server 324. The example data flow includes receiving user-defined geofence attributes 304 and translation of a geofence data element 306 (e.g., generating coordinates). In an example, the data flow may include transmitting data according to a GFS framework, such as on existing Internet protocol layers or using a GFS protocol 318 sitting on the application layer 310 (e.g., as a layer 7 (OSI) protocol) of the internet protocol stack 308. The GFS protocol 318 is an optional new protocol to implement a GFS framework for communicating geofence data.

The first user device 302 may connect to a GFS server 324 to forward defined geofence data. Existing geofence data for a user device may be deleted or updated over time at the GFS server 324 or elsewhere. The GFS server 324 may be one of a set of GFS servers (e.g., including GFS server 330). The servers in the set of GFS servers may communicate with each other, such as to forward geofence data, forward a geofence breach notification, or the like.

In some examples, the GFS server 324 stores geofence data (e.g., from one or more of the first user device 302, a second user device 322, a third user device 336 (e.g., as received from GFS server 330, or the like). The GFS server 324 may store the geofence data securely and allow this data to be shared as needed between different servers.

As part of inter-server communication, sharing data with a neighboring GFS server may be used to offload part of storage tasks depending on capacity usage or load balance workloads. In some examples, data may be shared with a GFS crawler 350 for searching and identifying a potential breach of a defined geofence. The GFS server 330 may exchange information with a GFS auditor 344 to assess validity of a geofence creation or deletion request coming from a user device. The GSF auditor may be a software system run by one or more independent parties.

The GFS auditor 344 may be used for checking and verifying whether a geofence creation or deletion request coming from a user device (e.g., forwarded by a GFS server 324 or 330) is authorized or not. Depending on the type of geofence in question, the GFS auditor 344 may access external resources for verification. For example, if a homeowner is attempting to create a geofence on a house, the GFS auditor 344 may verify whether the requestor is indeed the homeowner. This information is public information included as part of a property's history and may be provided by either private or government agencies upon request. In the case of a facial geofence, the GFS auditor 344 may confirm whether the face of the requestor matches the one in the facial geofence of interest.

In the case of a speech geofence, verification may be addressed by capturing and storing a voice identifier of a user at registration to access the GFS network. At the time of subscription, a voice sample of the user may be captured, from which the voice identifier may be generated and stored, such as at the GFS server 324. When a speech geofence request is raised by the user, the captured voice sample (that is to be geofenced) may be compared to the stored voice identifier for verification.

In some example, a GFS server (e.g., 324 or 330) may be used to complete a verification check, rather than or in addition to the GFS auditor 344. In the case of an emergency service declaring a geofence, the requesting system (e.g., an emergency or "911" service) may provide a verifiable credential. The credential, in this example, may be expressed in various forms including presenting a declaration from a known domain (e.g., *.gov).

The GFS crawler 350 is a server that may access geofence data and browse online platforms to detect geofenced data. The detected geofenced data may be compared to a personal geofence to determine whether a breach has occurred. For example, a user's facial geofence is likely to be breached on platforms where videos are shared. Therefore, platforms such as YouTube®, X®, and Instagram® are target locations the crawlers may search. Similarly, a location-based geofence may be breached by mapping applications where RGB photos of places are shared openly. The GFS crawler 350 may target mapping applications to detect such breaches. When the GFS crawler 350 detects a potential breach, the GFS crawler 350 notifies a relevant GFS server 324 to inform a user. Depending on a specified condition or based on a received indication from a user, a platform hosting the breach may be notified or warned to remove the geofenced data from public access.

In some examples, a personal geofence may have a start or stop duration. In some examples, the geofence is trigger (e.g., event) based. The personal geofence data may be submitted (e.g., by a user device 302, 322, or 336) to a connected GFS server (e.g., 324 or 330), optionally including an identity, an authority, or meta information.

A Geofence Services (GFS) framework may be used for communicating among the various devices of the block diagram 300. The GFS framework may be used to transmit or receive data regarding a new geofence, a change to a geofence, an indication of a potential or identified breach of a geofence rule, a privacy control setting corresponding to a geofence, or the like. The GFS framework may include a GFS communication protocol, such as a data structure and required data elements to facilitate information processing, interoperability, or offline (cache) behavior. The GFS framework may be used with or to store or send geofence data records, such as a standard data record that describes a geofence, a geofence boundary (e.g., coordinates that define an area of interest), inbound or outbound information flow for a geofence, geofence duration data a geofence trigger (e.g., enable or disable a geofence), a geofence beacon (e.g., a source of data that establishes a dynamic route), a geofence authority, or a geofence message (e.g., a communication channel between a requesting party and an observing party).

In an example, a geofence user may install a client application on a device (e.g., a smart phone) to provide geofence information or submit information to verify a client authority. An incentive for people to install the client application on the device is that the GFS framework may attest to an image, video, or other activity within a geofence as being authorized and approved. Other incentives include access to geofence benefits such as enabling the user to become aware of activities such as "sales", "music events", etc. An example data structure for defining a geofence includes:

TABLE 1

```
{
    "requestor": {
    "requestor_identity": "???",
    "requestor_authority": "???",
    "requestor_sig": "???"
    },
        "boundary_type": "static",
        "boundary_coordinates": [ ],
        "boundary_geometry": "???",
    "programmatic_functions": { },
        "trigger": "???",
    "beacon": "???",
    "metadata": [ ],
        "message": "???",
    "data_flow": "outbound",
    "altitude": etc etc
    "aerial shape": dome, square
    }
```

In some examples, a user may walk a path or route to define a personal geofence, such as with a smartphone, or may plot a personal geofence, for example on a computer. The result is a set of coordinates that describe the personal geofence, for example as a polygon, collection of polygons, polyhedron, collection of polyhedrons, mix of polygons and polyhedrons, or the like. In the case of facial and vocal geofences, "boundary_coordinates" may include information on facial landmarks or sampled speech data for the geofence subject.

A dynamically defined geofence may have a shape that changes over a prescribed period of time or based on triggers or events. The geofence data record may contain fields that define whether the geofence is static or dynamic. When dynamic, additional information may be included in the geofence data record. That additional information may describe a simple field (matrix, etc.) of coordinates over a period of time. In an example, a dynamic geofence boundary may be defined:

TABLE 2

```
{
"boundary_coordinates": [
{ "latitude": 45.5231, "longitude": -122.6765 },
{ "latitude": 45.5231, "longitude": -122.6755 },
{ "latitude": 45.5241, "longitude": -122.6755 },
{ "latitude": 45.5241, "longitude": -122.6765 },
{ "latitude": 45.5231, "longitude": -122.6765 },
```

TABLE 2-continued

```
{ "latitude": 45.5231, "longitude": -122.6775 },
{ "latitude": 45.5241, "longitude": -122.6775 },
{ "latitude": 45.5241, "longitude": -122.6765 },
{ "latitude": 45.5231, "longitude": -122.6765 },
{ "latitude": 45.5231, "longitude": -122.6765 }
]
}
```

Figure 4:
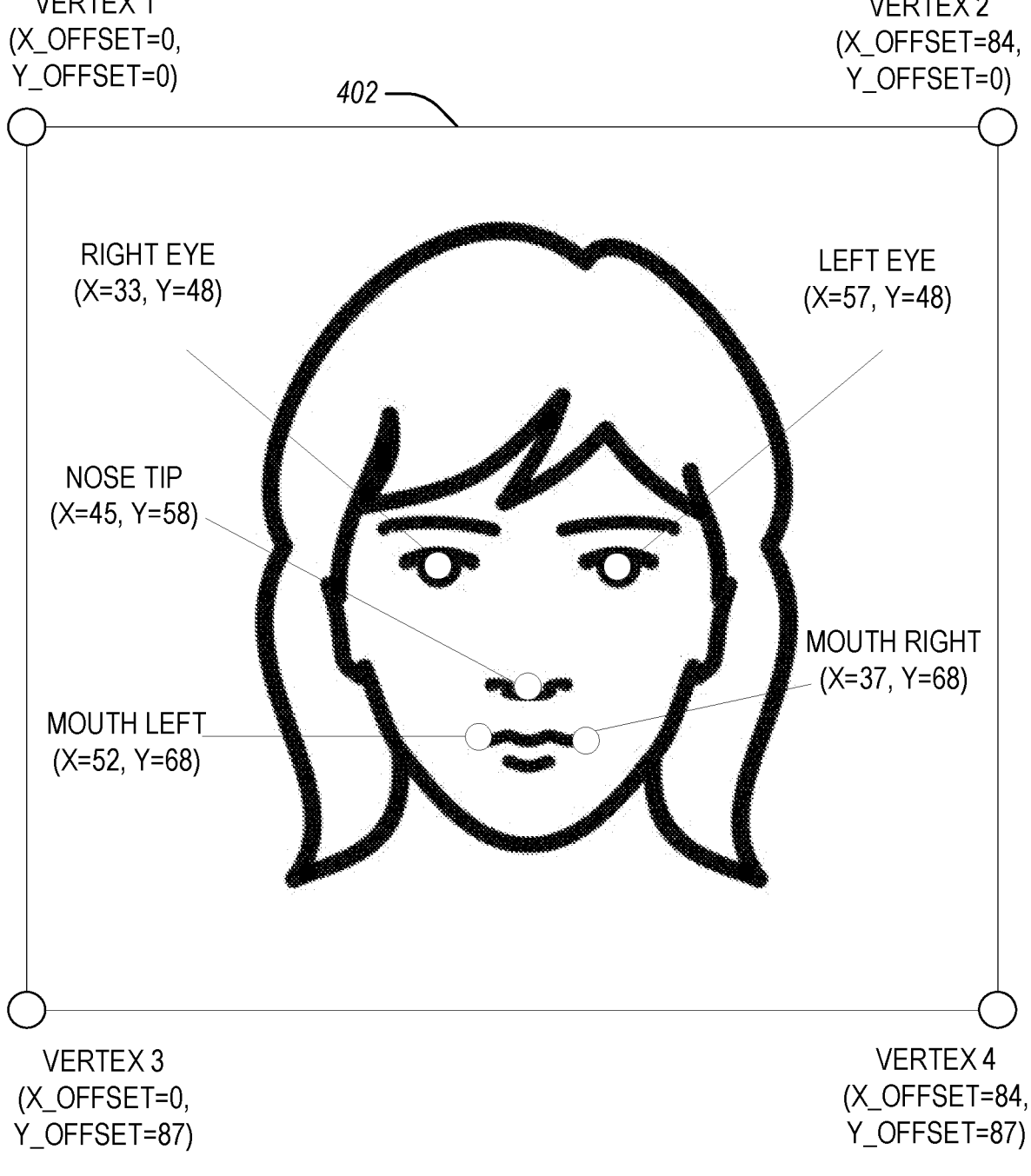
FIG. 4 illustrates an example of a facial geofence utilizing geofence boundary coordinates, according to various examples.

FIG. 4 illustrates an example of a facial geofence utilizing geofence boundary coordinates, according to various examples. FIG. 4 demonstrates how a geofence boundary field may be used to encode a facial geofence 402. FIG. 4 includes an image 400 with a user's face. In the example image 400, five unique landmarks are shown on the face, but an arbitrarily larger or smaller number of features may be used. Landmarks and geofence boundary vertices may be defined using x,y coordinates of pixel positions in the image. With this generalizable definition, it is possible to define body geofence boundaries of any shape and size.

The geofence example in FIG. 4 may be encoded into the "boundary_coordinates" as follows:

TABLE 3

```
{ "boundary_coordinates":
{
"vertex_coordinates": [
{ "x": 0, "y": 0 },
{ "x": 84, "y": 0 },
{ "x": 0, "y": 87 },
{ "x": 84, "y": 87 }
],
"landmark_coordinates": {
"left_eye": {"x": 57, "y": 48},
"right_eye": {"x": 33, "y": 48},
"nose_tip": {"x": 45, "y": 58},
"mouth_left": {"x": 52, "y": 68},
"mouth_right": {"x": 37, "y": 68}
}
}
}
```

In the example of a speech geofence, provision of "boundary_coordinates" may not be relevant since the entire subject speech is to be geofenced. Therefore, in the case of a speech geofence the "boundary_coordinates" may be left blank as follows:

TABLE 4

```
}
"boundary_coordinates": [ ]
}
```

In this case, the relevant speech geofence information may be extracted from a "metadata" field of the geofence data record. Further attributes of a geofence may include:

TABLE 5

```
{
"metadata":[
"requestor_type": "Employee",
"requestor_of": "Agency",
"requestor_of_name": "DOT",
"requestor_state": "Oregon",
"requestor_city": "Portland",
"requesor_id": "123456",
"start": "1635506400",
"stop": "1636111200",
"fence_type": "restrict",
```

TABLE 5-continued

```
"of__activities__type": "video,audio,pictures",
"exception": "law__enforcement",
"coordinate__type": "face, speech, property"
]
}
```

For the facial and speech geofence cases, the "coordinate_type" field may read "face" and "speech", respectively. The "metadata" field may include the pixel information of the image provided by the geofence subject in the case of a facial geofence while the time series speech samples (e.g., as 16-bit numbers) may be used for a speech geofence.

The "data_flow" is described below as opaque, inbound, outbound or open. An opaque data_flow is a geofence where no information enters or leaves the geofence. For example, at the scene of an automobile accident the geofence may be used to prohibit an image or video from being captured by a third party. With an outbound data_flow, data may be generated from within the geofence and shared "outbound" (but data is not allowed to flow in). With an inbound data_flow, data may be generated from sources external to the geofence and shared to systems within the geofence (but data is not allowed to flow out). In an open geofence, no restrictions on the flow of data in or out of the geofence are placed.

In some examples, a trigger event may dynamically enable or disable a geofence. A trigger event may be a discoverable event that may be described specific terms. An ad hoc/standard trigger may be initiated via a user device (such as a smart phone) where the user may specify a geographic boundary, facial features, complete or partial body parts, speech segment for vocal identifier extraction, or the like. In some examples, the definition of the type of geofence also acts as the impromptu trigger of the geofence itself in this mode.

An event/scheduled trigger performs a different function, for example where no device exists at or in proximity to the geofence. In this example, a geofence mechanism is provided for use cases such as, pre-establish authority for a given location where a device may need to generate a geofence yet the device itself may not have sufficient authority. In this case, a trigger may include authentication of a device with a set of coordinates.

A geofence may present itself as active if no device is detected for a given location during a given timeframe or if x or >x quantity of devices enter an area. This may be useful as a failsafe method in security scenarios.

The analysis of a face or voice, when indicated as the primary trigger of a geofence, may require the active analysis of every face or voice encountered thereby creating a large, and likely impractical, load on the GFS system. Therefore, a lighter weight data record trigger, may be associated with a device that refers a secondary device to a secondary GFS record. In other words, if Alice is using her smartphone camera and approaching Bob, who also has a smartphone, and Bob has filed a GFS geofence record with his face as a trigger, then Alice's device may receive a GFS notification that a facial geofence is in proximity. Then Alice's device may take more "active" measures in scanning faces to determine if a geofenced face is in the smartphone camera video. Bob's facial data may be sent from a server to Alice's device to allow Alice's phone to perform local (e.g., on-device) analysis of observed faces. This defines a source of data that establishes a dynamic route.

In an illustrative example, a truck carrying a dangerous or secret cargo may be geofenced by a personal geofence (here personal refers to an object rather than a person, but is still personal to the object, rather than being static to land). The geofence may supply information to those in proximity of the truck. It may not be practical to geofence the entire route, so a geofence may be established along the moving vehicle. A trigger may be a GPS attached to a radio system. The radio system, in this example, may share coordinates of the truck's path. The geofence may update the location in near real-time.

Figure 5:
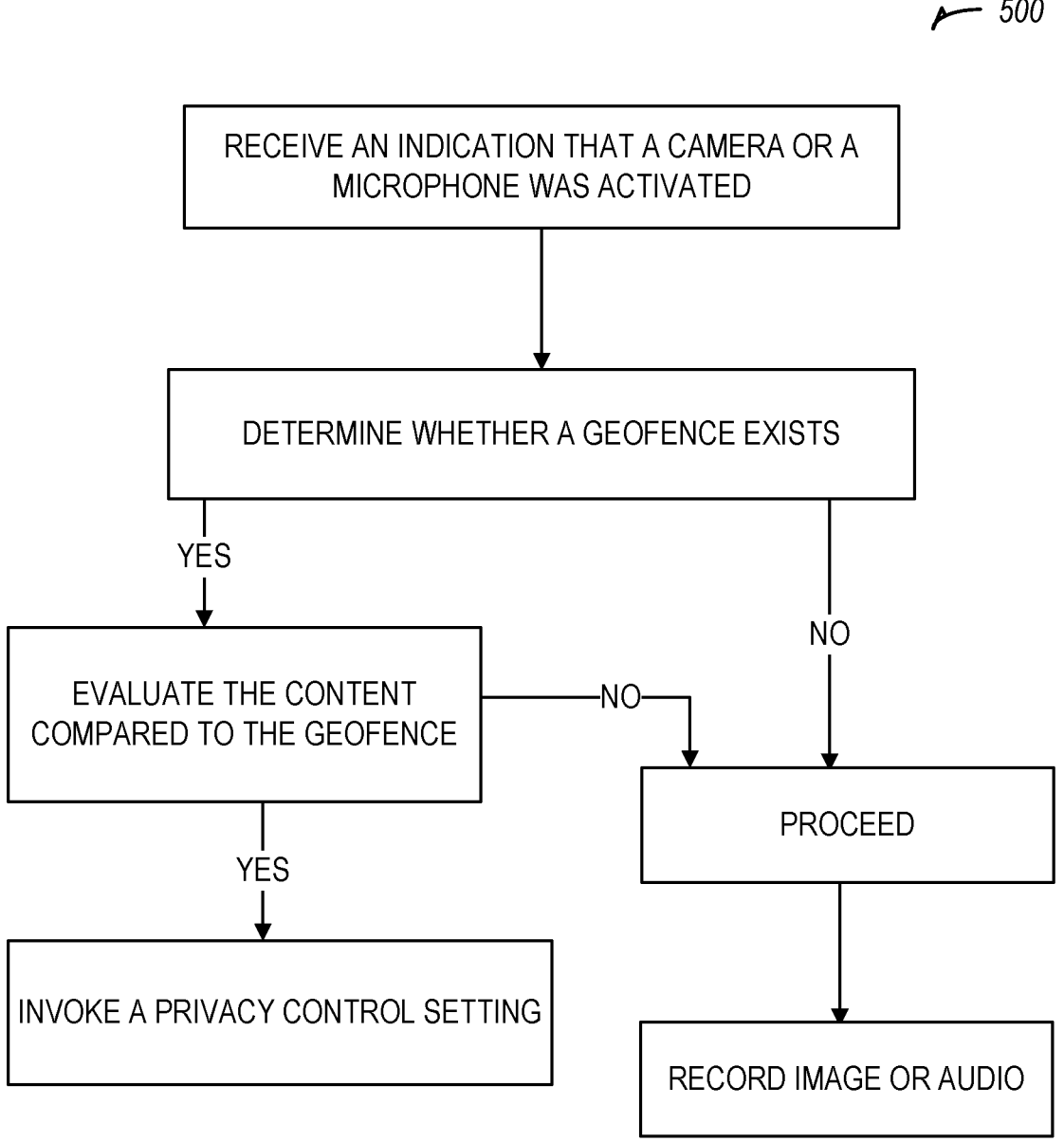
FIG. 5 illustrates a flowchart including a technique to determine whether a geofence exists, according to various examples.

FIG. 5 illustrates a flowchart including a technique 500 to determine whether a geofence exists, according to various examples. The technique 500 includes an operation to receive a request, based on activation or capture of an image or audio by a camera or microphone, a request to a GFS system. The technique 500 includes an operation to determine whether a geofence exists for data in the image or audio. The technique 500 includes an operation to, when a geofence is found, evaluate the geofence to determine whether a privacy indication was violated. When yes, an indication may be sent to a device to implement a privacy control. When there is no geofence or the geofence was not violated, the camera or microphone may proceed with recording.

The following pseudocode is provided as an example of how to determine if a query triggers a geofence:

TABLE 6

```
function pointInPolygon(point, polygon):
  x, y = point
  isInside = false
  for i from 0 to the number of vertices − 1:
    xi, yi = polygon[i]
    xj, yj = polygon[i + 1] (wrap around to the first vertex for the last
    one)
    if y > min(yi, yj):
      if y <= max(yi, yj):
        if x <= max(xi, xj):
          if yi != yj:
            xints = (y − yi) * (xj − xi) / (yj − yi) + xi
          if xi == xj or x <= xints:
            isInside = not isInside
  return isInside
```

Figure 6:
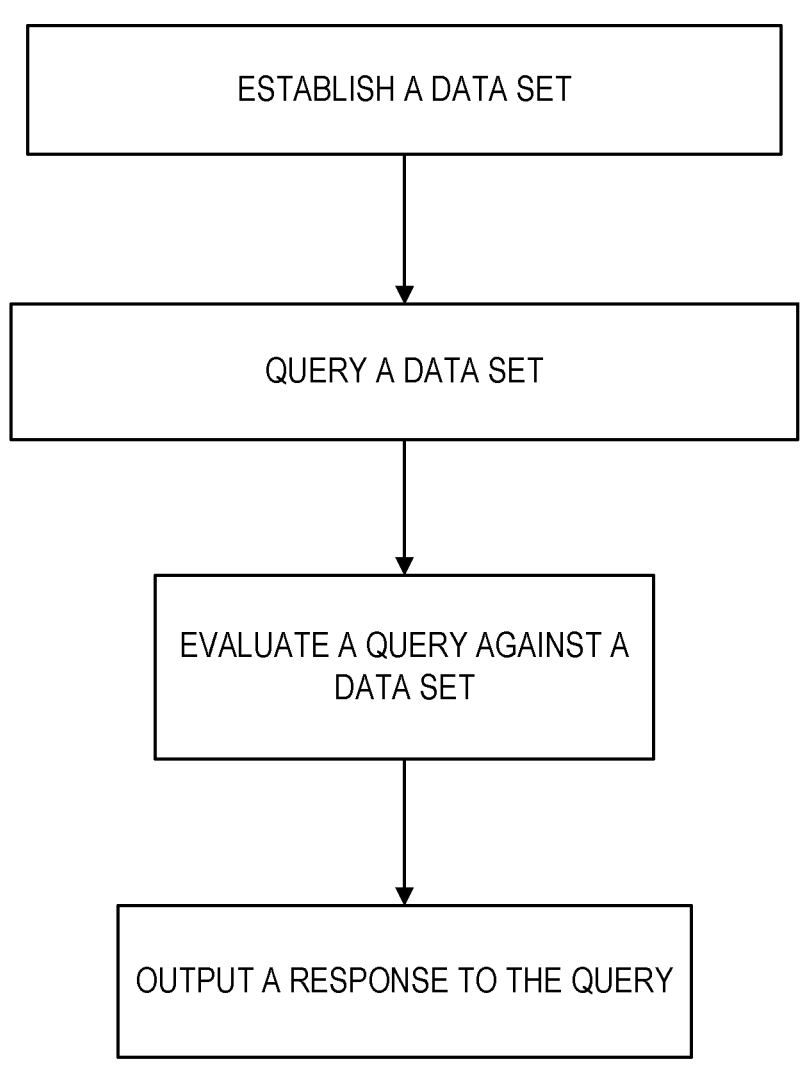
FIG. 6 illustrates a flowchart showing a technique for a user device setup, according to various examples.

FIG. 6 illustrates a flowchart showing a technique 600 for a user device setup, according to various examples. The technique 600 includes an operation to establish a data set. The technique 600 includes an operation to query a data set. The technique 600 includes an operation to evaluate a query against a data set. The technique 600 includes an operation to output a response to the query. The response may include stop an action, proceed with an action, or ignore the response. Subsequent datasets may reference the query and response action.

In the context of the GFS framework, users have the capability to establish and query GFS datasets. The GFS system may be used to evaluate these queries and offer a choice of approval or rejection. In the context of a client using a smartphone, for example, in wanting to take a video, the client evaluates the response and may decide to stop, proceed, or ignore guidance. In some examples, the device may be required to adhere to the guidance. When creating a geofence in a GFS system, the GFS system may allow for dynamic or different paths to be taken based on the specific conditions encountered during dataset creation. In some examples, the process is designed to support subsequent datasets, enabling them to reference previous query and response actions, making it a dynamic and adaptable system.

FIG. 7 illustrates a flowchart showing a technique for transmitting a privacy control setting to a second user device in response to a trigger event. For example, a first user device may establish a personal geofence designed to protect specific data such as the user's images, videos, or audio recordings containing the user's facial or vocal features.

The technique 700 includes an operation 702 to receive an indication of data to be protected by a personal geofence. The data may include at least one of a facial feature, a vocal feature, or the like.

The technique 700 includes an operation 704 to detect a trigger event based on information received from a second user device. The information may indicate a violation of the personal geofence. In some examples, the trigger event may include a capture of an image or sound within a geographic boundary of the personal geofence. In an example, the trigger event may include the initiation of a live stream within the geofenced area, such as when a facial feature or vocal feature is identified within the live stream. The trigger event may be identified when the second user device attempts to upload previously captured media containing geofenced data, such as to a social media platform or cloud storage. The trigger event may include a tagging or labeling of an image or audio with location data or a personal identifier that violates a privacy setting of the personal geofence.

The technique 700 includes an operation 706 to, in response to detecting the trigger event, identify at least one privacy control setting corresponding to the personal geofence based on the data. In some examples, the privacy control settings include a requirement to modify captured content on the second user device to not violate to the personal geofence. For example, the second user device may blur identifiable features in an image or a video, altering pitch or tone of captured audio to render a voice unrecognizable, or prevent the capture or saving of content from or within the geofenced area. In an example, when the trigger event includes capturing an image within the geofenced area that includes the facial feature, the identified privacy control setting may indicate that the photo be automatically blurred around the facial region before it is saved or shared from the second user device. In examples involving audio capture, the at least one privacy control setting may adjust an audio file to distort captured speech to protect the vocal identity of a user. In another example, the at least one privacy control setting may be dynamically applied based on a nature of the trigger event or specific privacy preferences associated with the personal geofence. The at least one privacy control setting may include a reactive privacy control setting to obscure the data in media identified online. The trigger event may include at least one of the second user device entering a predefined physical area, the second user device capturing the facial feature with a camera, the second user device capturing the vocal feature with an audio recording device, or the like.

The technique 700 includes an operation 708 to transmit the at least one privacy control setting to the second user device. The at least one privacy control setting may indicate a modification to captured content on the second user device associated with the violation of the personal geofence. In an example, the transmission instructs the second user device how to adjust the captured media to not violate the personal geofence. For example, the second user device may automatically blur the facial feature in a photo before it is viewed, shared, or saved. When the data includes the facial feature, a modification to the captured content includes blurring the facial feature in the captured content.

The technique 700 may include an operation to adjust an area covered by the personal geofence based on the at least one privacy control setting. The technique 700 may include an operation to change coordinates of the personal geofence in response to receiving an indication that the first user device has moved. The technique 700 may include an operation to receive, from the first user device, a change to the data and in response, updating the at least one privacy control setting.

Figure 8A:
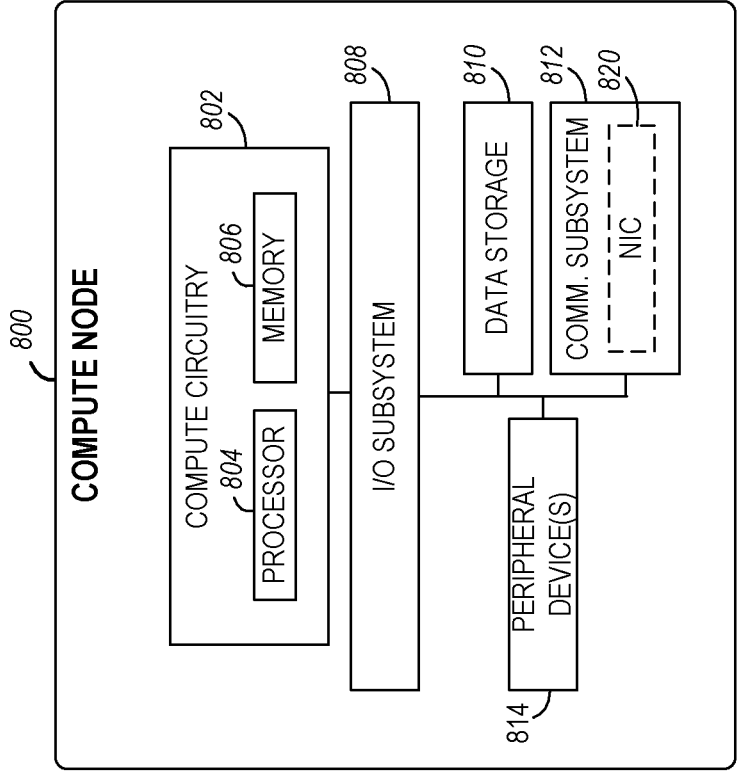
FIG. 8A provides an overview of example components for compute deployed at a compute node.

In the simplified example depicted in FIG. 8A, a compute node 800 includes a compute engine (also referred to herein as "compute circuitry") 802, an input/output (I/O) subsystem 808, data storage 810, a communication circuitry subsystem 812, and, optionally, one or more peripheral devices 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or other processor or processing/controlling circuit.

In some examples, the processor 804 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 or the main memory 806) and other components of the compute circuitry 802. For example, the I/O subsystem 808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

The one or more illustrative data storage devices 810 may be embodied as any type of devices configured for short-term or long-term storage of data such as, for example, memory devices and circuits, memory cards, hard disk drives, solid-state drives, or other data storage devices. Individual data storage devices 810 may include a system partition that stores data and firmware code for the data storage device 810. Individual data storage devices 810 may also include one or more operating system partitions that store data files and executables for operating systems depending on, for example, the type of compute node 800.

The communication circuitry 812 may be embodied as any communication circuit, device, or collection thereof, capable of enabling communications over a network between the compute circuitry 802 and another compute device (e.g., a gateway of an implementing computing system). The communication circuitry 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., a gateway node). In some examples, the NIC 820 may be embodied as part of a system-on-a-chip (SoC) that includes one or more processors, or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or alternatively, in such examples, the local memory of the NIC 820 may be integrated into one or more components of the client compute node at the board level, socket level, chip level, or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective compute node (whether a client, gateway, or aggregation node) in a computing system or like forms of appliances, computers, subsystems, circuitry, or other components.

Figure 8B:
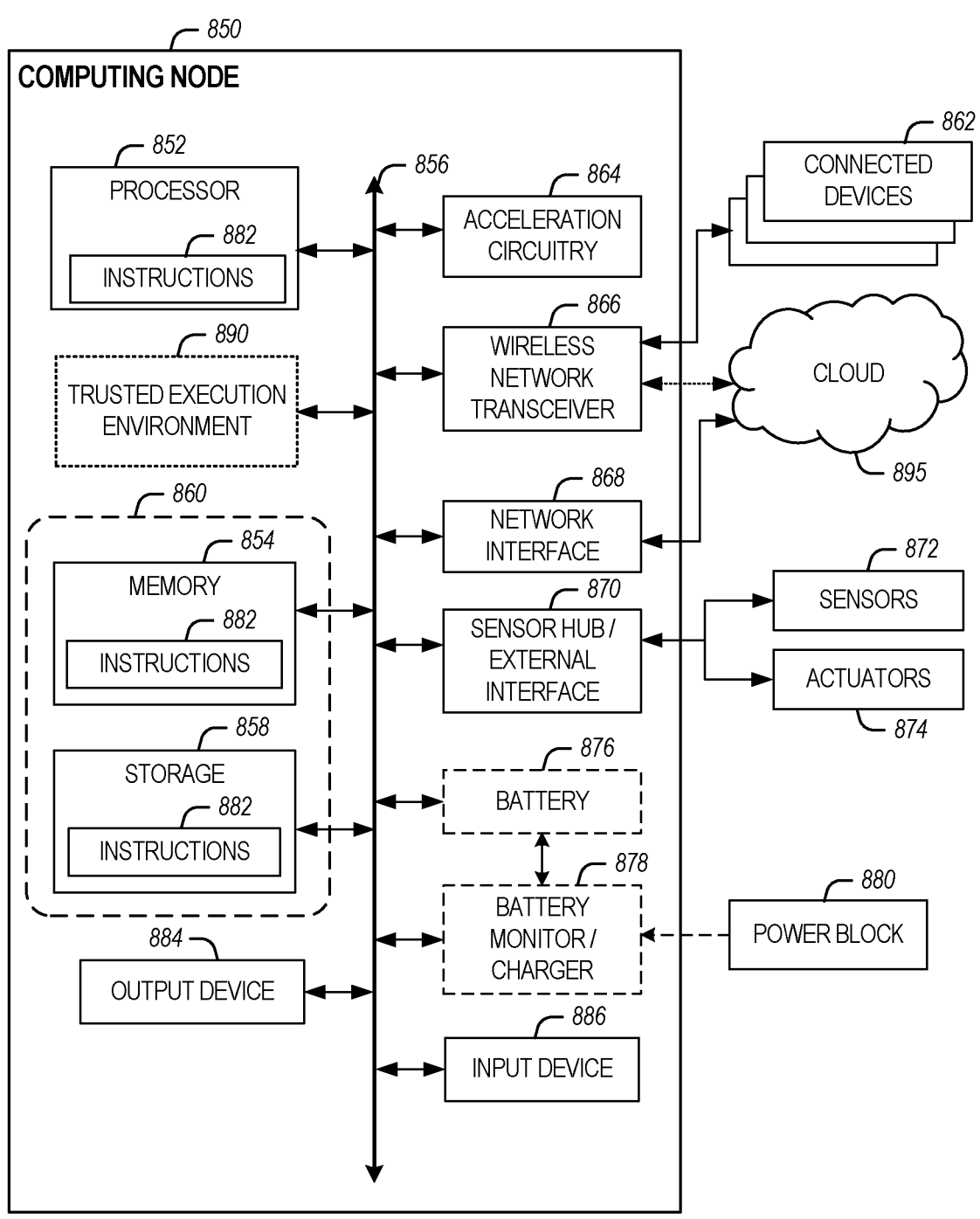
FIG. 8B provides a further overview of example components within a computing device.

In a more detailed example, FIG. 8B illustrates a block diagram of an example of components that may be present in a computing node 850 for implementing the techniques (e.g., operations, processes, methods, and methodologies) described herein. This computing node 850 provides a closer view of the respective components of node 800 when implemented as or as part of a computing device (e.g., as a mobile device, a base station, server, gateway, etc.). The computing node 850 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 850, or as components otherwise incorporated within a chassis of a larger system.

The computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8B.

The processor 852 may communicate with a system memory 854 over an interconnect 856 (e.g., a bus). Any number of memory devices may be used to provide for a given amount of system memory. As examples, the memory 854 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected devices 862. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the computing node 850 may communicate with close devices, e.g., within about 10 meters, using a local transceiver based on Bluetooth Low Energy (BLE), or another low power radio, to save power. More distant connected devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the cloud 895 via local or wide area network protocols. The wireless network transceiver 866 may be a low-power wide-area (LPWA) transceiver that follows the IEEE 802.15.4, or IEEE 802.15.4g standards, among others. The computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the cloud 895 or to other devices, such as the connected devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the computing node 850 to actuators 874, such as power switches, valve actuators, an audible sound generator, a visual warning device, and the like.

In some optional examples, various input/output (I/O) devices may be present within or connected to, the computing node 850. For example, a display or other output device 884 may be included to show information, such as sensor readings or actuator position. An input device 886, such as a touch screen or keypad may be included to accept input.

An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 850. A display or console hardware, in the context of the present system, may be used to provide output and receive input of a computing system; to manage components or services of a computing system; identify a state of a computing component or service; or to conduct any other number of management or administration functions or service use cases.

A battery 876 may power the computing node 850, although, in examples in which the computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information mation representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is at least one machine-readable medium, including instructions, which when executed by processing circuitry, cause the processing circuitry to perform operations to: receive an indication of data to be protected by a personal geofence, the data including at least one of a facial feature or a vocal feature of a user; detect a trigger event based on information received from a user device, the information indicating a violation of the personal geofence; in response to detecting the trigger event, identify at least one privacy control setting corresponding to the personal geofence based on the data; and transmit the at least one privacy control setting to the user device, the at least one privacy control setting indicating a modification to captured content on the user device associated with the violation of the personal geofence.

In Example 2, the subject matter of Example 1 includes, wherein a geographic boundary of the personal geofence is automatically adjusted based on a movement of a second user device corresponding to the user.

In Example 3, the subject matter of Examples 1-2 includes, adjusting, by the processing circuitry, an area covered by the personal geofence based on the at least one privacy control setting.

In Example 4, the subject matter of Examples 1-3 includes, wherein the trigger event includes a capture of an image or sound within a geographic boundary of the personal geofence.

In Example 5, the subject matter of Examples 1-4 includes, wherein the at least one privacy control setting includes instructions for automatically blurring the facial feature, altering the vocal feature in captured content, or removing the captured content associated with the violation of the personal geofence.

In Example 6, the subject matter of Examples 1-5 includes, wherein the data includes the facial feature and wherein the modification to the captured content includes blurring the facial feature in the captured content.

In Example 7, the subject matter of Examples 1-6 includes, changing coordinates of the personal geofence in response to receiving an indication that a second user device corresponding to the user has moved.

In Example 8, the subject matter of Examples 1-7 includes, wherein the trigger event includes at least one of the user device entering a predefined physical area defined by the personal geofence, the user device capturing the facial feature with a camera, or the user device capturing the vocal feature with an audio recording device.

In Example 9, the subject matter of Examples 1-8 includes, receiving, from the user, a change to the data and in response, updating the at least one privacy control setting.

In Example 10, the subject matter of Examples 1-9 includes, wherein the at least one privacy control setting includes a preemptive privacy control setting to obscure the data during capture of media by the user device based on the personal geofence.

In Example 11, the subject matter of Examples 1-10 includes, wherein the at least one privacy control setting includes a reactive privacy control setting to obscure the data in media identified online.

Example 12 is a system comprising: processing circuitry; and memory, including instructions, which when executed by the processing circuitry, cause the processing circuitry to perform operations to: detect, by a first user device, a trigger event indicating an action by the first user device that implicates a personal geofence associated with a second user device, the action corresponding to captured content at the first user device; query a server for geofence data associated with the second user device, receive, from the server in response to detecting the trigger event, the geofence data including at least one privacy control setting corresponding to the personal geofence associated with the second user device; modify, in accordance with the at least one privacy control setting, the captured content on the second user device to comply with the at least one privacy control setting specified by the personal geofence; and transmit, by the first user device to the server, a confirmation of the modification of the captured content that implicated the personal geofence.

In Example 13, the subject matter of Example 12 includes, wherein the trigger event is detected based on a geographic location of the second user device relative to a boundary of the personal geofence associated with the first user device.

In Example 14, the subject matter of Examples 12-13 includes, wherein the at least one privacy control setting includes instructions to blur a facial feature or distort a vocal recording within the recorded content or saved content.

Example 15 is at least one machine-readable medium including instructions, which when executed by processing circuitry of a server, cause the processing circuitry to perform operations to: monitor for at least one media capture violating a personal geofence associated with a first user device; detect that the at least one media capture violates the personal geofence associated with the first user device, the at least one media capture including at least one of a photo, video, or audio captured by a second user device; and in response to detecting that the at least one media capture violates the personal geofence associated with the first user device, notify the first user device, by the server, of the at least one media capture occurring within the personal geofence associated with the first user device.

In Example 16, the subject matter of Example 15 includes, operations to transmit a plurality of options for managing the at least one media capture, wherein the options include deleting the at least one media capture, blurring identifiable features in the at least one media capture, or notifying the second user device of the at least one media capture.

In Example 17, the subject matter of Examples 15-16 includes, wherein a notification to the first user device includes a preview of the at least one media capture.

In Example 18, the subject matter of Examples 15-17 includes, operations to update the personal geofence associated with the first user device based on a privacy control setting corresponding to the personal geofence.

In Example 19, the subject matter of Examples 15-18 includes, wherein coordinates of the personal geofence are defined based on encoded coordinates associated with a digital representation of a facial feature or a vocal feature of the first user device.

In Example 20, the subject matter of Examples 15-19 includes, wherein to notify the first user device includes to use a set of application programming interfaces (APIs).

Example 21 is a method comprising: receiving, from a first user device, geofence data, the geofence data received in a geofence data structure; parsing the geofence data to identify, from the geofence data structure, a device identifier of the first device, a set of geofence coordinates, and at least one privacy control setting; storing the parsed geofence data at a geofence server; receiving, from a second user device, a query at the geofence server, the query including a device identifier of the first device; and sending, to the second user device, the set of geofence coordinates and the at least one privacy control setting.

In Example 22, the subject matter of Example 21 includes, updating the set of geofence coordinates and the at least one privacy control setting in response to receiving updated geofence data from the first user device.

In Example 23, the subject matter of Examples 21-22 includes, validating the device identifier of the first user device before sending the set of geofence coordinates and the at least one privacy control setting.

In Example 24, the subject matter of Examples 21-23 includes, wherein the at least one privacy control setting includes instructions for the second user device on actions to take when within the set of geofence coordinates.

In Example 25, the subject matter of Examples 21-24 includes, wherein the set of geofence coordinates are defined based on encoded coordinates associated with a digital representation of a facial feature or a vocal feature of the first user device.

In Example 26, the subject matter of Examples 21-25 includes, encrypting the communication between the geofence server and the second user device.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

Although these implementations have been described with reference to specific exemplary aspects, it will be evident that various modifications and changes may be made to these aspects without departing from the broader scope of the present disclosure. Many of the arrangements and processes described herein may be used in combination or in parallel implementations to provide greater bandwidth/throughput and to support services selections that may be made available to the systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks), memory cards or sticks, random access memories (RAMs), read only memories (ROMs), and the like.

What is claimed is:

1. At least one non-transitory machine-readable medium, including instructions, which when executed by processing circuitry, cause the processing circuitry to perform operations to: receive an indication of data to be protected by a personal geofence, the data including at least one of a facial feature or a vocal feature of a user; detect a trigger event based on information received from a user device, the information indicating a violation of the personal geofence; in response to detecting the trigger event, identify at least one privacy control setting corresponding to the personal geofence based on the data; and transmit the at least one privacy control setting to the user device, the at least one privacy control setting indicating a modification to captured content on the user device associated with the violation of the personal geofence.

2. The at least one machine-readable medium of claim 1, wherein a geographic boundary of the personal geofence is automatically adjusted based on a movement of a second user device corresponding to the user.

3. The at least one machine-readable medium of claim 1, further comprising adjusting, by the processing circuitry, an area covered by the personal geofence based on the at least one privacy control setting.

4. The at least one machine-readable medium of claim 1, wherein the trigger event includes a capture of an image or sound within a geographic boundary of the personal geofence.

5. The at least one machine-readable medium of claim 1, wherein the at least one privacy control setting includes instructions for automatically blurring the facial feature, altering the vocal feature in captured content, or removing the captured content associated with the violation of the personal geofence.

6. The at least one machine-readable medium of claim 1, wherein the data includes the facial feature and wherein the modification to the captured content includes blurring the facial feature in the captured content.

7. The at least one machine-readable medium of claim 1, further comprising changing coordinates of the personal geofence in response to receiving an indication that a second user device corresponding to the user has moved.

8. The at least one machine-readable medium of claim 1, wherein the trigger event includes at least one of the user device entering a predefined physical area defined by the personal geofence, the user device capturing the facial feature with a camera, or the user device capturing the vocal feature with an audio recording device.

9. The at least one machine-readable medium of claim 1, further comprising receiving, from the user, a change to the data and in response, updating the at least one privacy control setting.

10. The at least one machine-readable medium of claim 1, wherein the at least one privacy control setting includes a preemptive privacy control setting to obscure the data during capture of media by the user device based on the personal geofence.

11. The at least one machine-readable medium of claim 1, wherein the at least one privacy control setting includes a reactive privacy control setting to obscure the data in media identified online.

12. A system comprising:

processing circuitry; and memory, including instructions, which when executed by the processing circuitry, cause the processing circuitry to perform operations to:

detect, by a first user device, a trigger event indicating an action by the first user device that implicates a personal geofence associated with a second user device, the action corresponding to captured content at the first user device;

query a server for geofence data associated with the second user device, receive, from the server in response to detecting the trigger event, the geofence data including at least one privacy control setting corresponding to the personal geofence associated with the second user device;

modify, in accordance with the at least one privacy control setting, the captured content on the first user device to comply with the at least one privacy control setting specified by the personal geofence; and transmit, by the first user device to the server, a confirmation of the modification of the captured content that implicated the personal geofence.

13. The system of claim 12, wherein the trigger event is detected based on a geographic location of the first user device relative to a boundary of the personal geofence associated with the second user device.

14. The system of claim 12, wherein the at least one privacy control setting includes instructions to blur a facial feature or distort a vocal recording within the captured content.

15. At least one non-transitory machine-readable medium including instructions, which when executed by processing circuitry of a server, cause the processing circuitry to perform operations to: monitor for at least one media capture violating a personal geofence associated with a first user device; detect that the at least one media capture violates the personal geofence associated with the first user device, the at least one media capture including at least one of a photo, video, or audio captured by a second user device; and in response to detecting that the at least one media capture violates the personal geofence associated with the first user device, notify the first user device, by the server, of the at least one media capture occurring within the personal geofence associated with the first user device.

16. The at least one machine-readable medium of claim 15, further comprising operations to transmit a plurality of options for managing the at least one media capture, wherein the options include deleting the at least one media capture, blurring identifiable features in the at least one media capture, or notifying the second user device of the at least one media capture.

17. The at least one machine-readable medium of claim 15, wherein a notification to the first user device includes a preview of the at least one media capture.

18. The at least one machine-readable medium of claim 15, further comprising operations to update the personal geofence associated with the first user device based on a privacy control setting corresponding to the personal geofence.

19. The at least one machine-readable medium of claim 15, wherein coordinates of the personal geofence are defined based on encoded coordinates associated with a digital representation of a facial feature or a vocal feature of the first user device.

20. The at least one machine-readable medium of claim 15, wherein to notify the first user device includes to use a set of application programming interfaces (APIs).

* * * * *